United States Patent [19]

Fields

[11] Patent Number: 4,782,939
[45] Date of Patent: * Nov. 8, 1988

[54] CAN UNSCRAMBLER SYSTEM

[76] Inventor: W. George Fields, Box 431, Newark, Tex. 76071

[*] Notice: The portion of the term of this patent subsequent to Apr. 12, 2005 has been disclaimed.

[21] Appl. No.: 55,729

[22] Filed: May 29, 1987

Related U.S. Application Data

[63] Continuation-in-part of Ser. No. 815,227, Dec. 31, 1985, Pat. No. 4,736,831.

[51] Int. Cl.$^4$ .............................................. B65G 43/08
[52] U.S. Cl. .................................... 198/395; 198/399; 198/400; 198/417; 198/438; 198/689.1
[58] Field of Search ............... 198/396, 399, 455, 389, 198/390, 395, 398, 400, 417, 438, 689.1, 817, 582, 443, 415; 209/540, 544, 587, 597, 644, 905, 539, 545

[56] References Cited

U.S. PATENT DOCUMENTS

| | | | |
|---|---|---|---|
| 1,416,763 | 5/1922 | Thom | 198/455 X |
| 2,633,971 | 4/1953 | Albertoli et al. | 198/455 X |
| 2,637,433 | 5/1953 | Shuttleworth | 198/415 |
| 2,815,845 | 12/1957 | Albertoli | 198/400 |
| 2,873,018 | 2/1959 | Dudley et al. | 198/395 |
| 3,185,277 | 5/1965 | Agnew | 198/438 X |
| 3,331,486 | 7/1967 | Towry | 198/398 X |
| 3,425,530 | 2/1969 | Carter | 198/396 |
| 3,502,195 | 3/1970 | Benner | 198/689.1 X |
| 4,593,805 | 6/1986 | Huddle | 198/400 X |

FOREIGN PATENT DOCUMENTS 2709787 9/1978 Fed. Rep. of Germany ...... 198/455

Primary Examiner—Robert J. Spar
Assistant Examiner—Cheryl L. Gastineau
Attorney, Agent, or Firm—Arthur F. Zobal; Geoffrey A. Mantooth

[57] ABSTRACT

A can unscrambler system, having a longitudinal can arranger and an unscrambler apparatus, orients randomly oriented unfilled cans having an open end and a closed end such that all of the open ends face the same direction. The longitudinal can arranger arranges randomly oriented cans longitudinally onto a conveyer for transportation to the unscrambler apparatus. The randomly oriented cans are loaded into a collection zone of inclined surfaces, at the bottom of which is the conveyer. A turning belt located adjacent to the conveyer rotates cans that are in a crosswise mode over the conveyer and a brush assembly located downstream of the collection zone allows only longitudinally arranged cans to pass therethrough. The cans are then loaded onto a vacuum conveyer belt at the unscrambler apparatus, where they are conveyed into a sorter mechanism. The sorter mechanism distinguishes between the closed and open ends of the cans and sorts accordingly. The sorted cans are oriented in the same direction by gravity tracks.

3 Claims, 8 Drawing Sheets

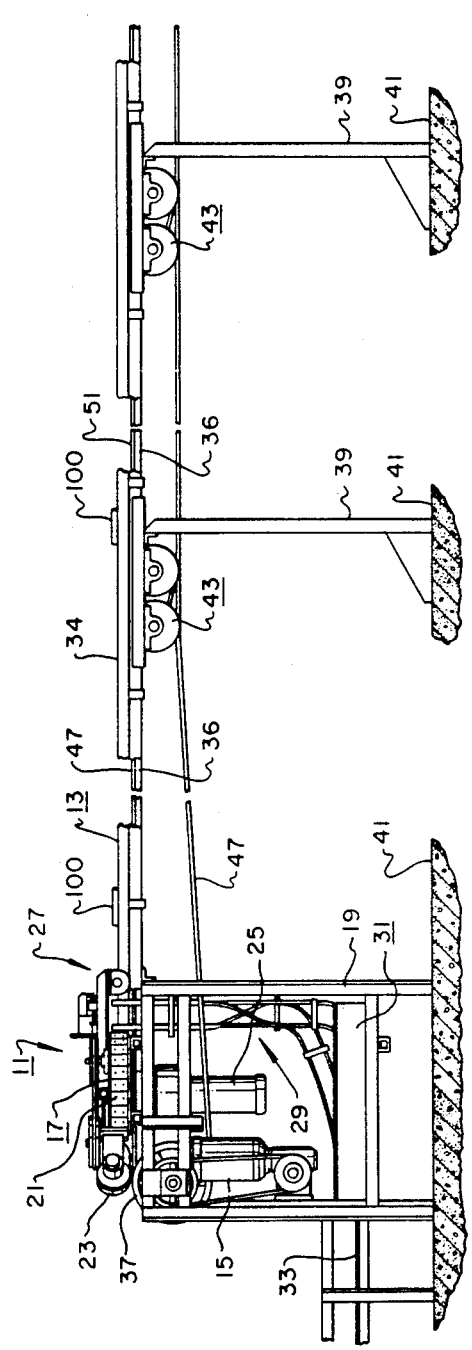
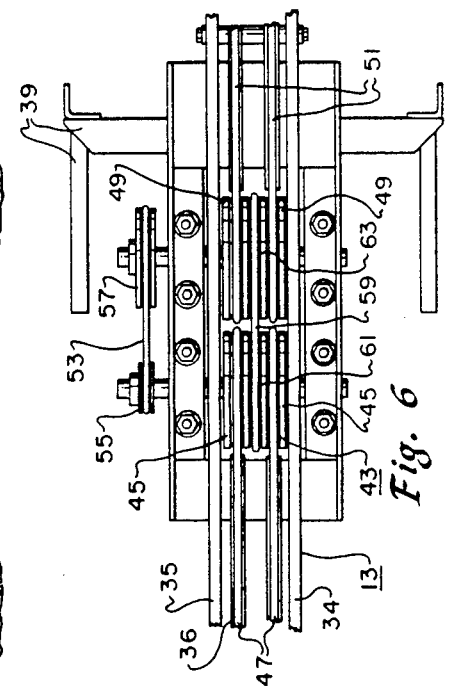
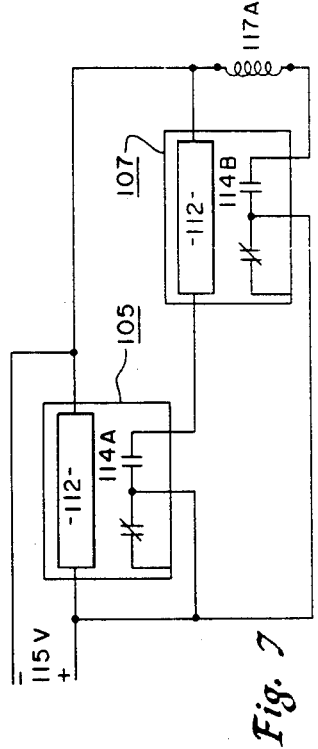

CAN UNSCRAMBLER SYSTEM

This application is a continuation-in-part of my copending application, Ser. No. 06/815,227, filed Dec. 31, 1985 now U.S. Pat. No. 4,736,831.

FIELD OF THE INVENTION

The invention relates to an apparatus capable of arranging randomly oriented cans longitudinally onto a conveyer so that the cans may be conveyed to another apparatus which is capable of distinguishing between the open ends and the closed ends of the cans and which arranges the cans so that all of the open ends face the same direction.

BACKGROUND OF THE INVENTION

Cans are used by many beverage manufacturers to package their product. Much of the manufacturing process of filling the cans with the appropriate beverage is automated, requiring conveyer belts to move the cans from place to place throughout the plant. At each point of the manufacturing process all of the unfilled cans must have the same orientation; the open ends must all face the same direction and the closed ends must face the opposite direction. The unfilled cans are usually very light in weight, thus as the cans are conveyed along, some are inevitably jostled off of the conveyer belt and onto the floor. These jostled or fallen cans have not only lost their place in the manufacturing process but their correct orientation as well. In order to reload the fallen cans back into the system, the original orientation must be restored; the open ends must all face the same direction. Reloading the cans into the manufacturing process is rarely done as a practical matter, even though normal can losses may amount to around 5% of the total number of cans, which in a large plant may mean thousands of cans every day, because reloading by either manual or automatic means is not cost effective. Instead of reloading, the cans are thrown away.

The prior art utilizes a base structure having the shape of a rounded projection onto which a can of random or scrambled orientation is dropped end first. Once the can is dropped onto the base structure, it quickly loses its balance and falls off. If the open end happens to be on top, the can slides off of the base structure in one direction. Conversely, if the closed end is on top, the can slides off in the other direction. Can unscramblers of the prior art have proven to be unreliable for several reasons. Control of the can is lost since the can is dropped and allowed to free fall one way or the other. The can may bounce off of the base structure in the wrong direction, or it may not land on the base structure correctly. Typically, once the cans have fallen off of a conveyer belt, they are washed before being reloaded into the manufacturing process. Any water that remains inside of a can after the washing process tends to alter the balance and cause a can to slide off in the wrong direction.

The apparatuses of the present invention as disclosed herein are particularly useful in the aluminum can industry. Aluminum cans are used extensively throughout the beverage industry, in lieu of steel cans, for economic reasons. Aluminum cans are typically two piece cans, having a cylindrical can body with open and closed ends, and a can top which is fitted onto the open end of the can body after the can body has been filled with the appropriate contents. Aluminum cans differ from comparable steel cans in several respects, notably fragility and ferrousness. A uptopped aluminum can body is much more fragile than an untopped steel can, particularly near the open end portion of the can body. The side wall of an aluminum can body has a thickness averaging only 0.006 inches. Furthermore, unlike steel cans, aluminum cans are nonferrous, rendering magnets useless as against aluminum cans. Therefore, much of the conventional can handling equipment that has been developed for steel cans is unsuitable for handling aluminum cans.

SUMMARY OF THE INVENTION

It is an object of the present invention to provide an apparatus that will unscramble unfilled cans of scrambled orientation, by orienting the cans such that their open ends all face the same direction, in a reliable manner.

The can unscrambler apparatus has a means for sorting unfilled cans, a means for conveying the cans into the sorting means, and a means for arranging the sorted cans. Cans are sorted into two categories according to which direction their open ends face. Cans having their open ends facing one direction are placed into one category while cans having their open ends facing the opposite direction are placed into the other category. Sorting of the cans is achieved by first distinguishing between the two categories of the cans followed by guiding the cans into their respective arranger means. The cans are conveyed into the sorter means by conveyance means which maintains control over each can until control is relinquished to the sorter means. The arranger means arranges the sorted cans into the same orientation. Throughout the entire unscrambling process, the orientations of the cans are maintained under constant control.

In a preferred embodiment of the can unscrambler, cans are conveyed to the sorter mechanism in a horizontal position with one end coupled to a conveyer belt by a partial vacuum. Proximity switches distinguish open ends from closed ends as the cans are conveyed past sensory elements. An air blast from a device controlled by the proximity switches strikes the sides of cans having their open ends facing a certain direction. These cans fall into one portion of the arranger mechanism which in the preferred embodiment is a gravity track. The other cans having their open ends facing the opposite direction from those that were air blasted off of the conveyer belt, pass through the proximity switches and stay on the conveyer belt until removed by another gravity grack. As the cans fall through the gravity tracks they are turned such that their open ends face the same preselected direction.

It is another object to provide an apparatus that will arrange randomly oriented cans longitudinally upon a conveyer, in a reliable manner, for transportation to the can unscrambler.

The longitudinal can arranger apparatus has a conveyer, a turning belt and gateway means. The conveyer extends through a collection zone where it is loaded with randomly oriented cans. The turning belt is positioned adjacent to said conveyer in the collection zone. The turning belt is located laterally to and above the conveyer so that cans that are positioned in a crosswise mode over said conveyer contact the turning belt with one of its ends. There is a means for moving the turning belt in a direction which is parallel to the conveyer so that the turning belt turns the crosswise mode cans into a longitudinal mode. The gateway means is located adjacent to the conveyer at a position downstream from the collection zone. The gateway means forms an opening, with the opening having a shape so as to allow cans that are arranged in a longitudinal mode on the conveyer to pass through and so as to prevent the passage of cans in other modes. The gateway means has means for removing cans which have been prevented from passing through the opening from the opening.

In a preferred embodiment of the longitudinal can arranger apparatus, the gateway means includes brush means positioned over the conveyer and means for rotating the brush means around an axis which is perpendicular to the direction of travel of the conveyer, with the bristles of the brush means rotating in a direction such that the bristles nearest the conveyer are traveling opposite to the conveyer.

BRIEF DESCRIPTION OF THE DRAWINGS

FIG. 1 is a view showing the left side of a can unscrambler apparatus in accordance with a preferred embodiment of the invention with an infeed conveyer and an outfeed conveyer.

FIG. 6 is a top plan view of an acceleration ramp.

FIG. 7 is an electrical block diagram showing the electrical connections between the infrared proximity switches and the air solenoid.

DESCRIPTION OF THE EMBODIMENT OF FIGS. 1-8

Figure 2:
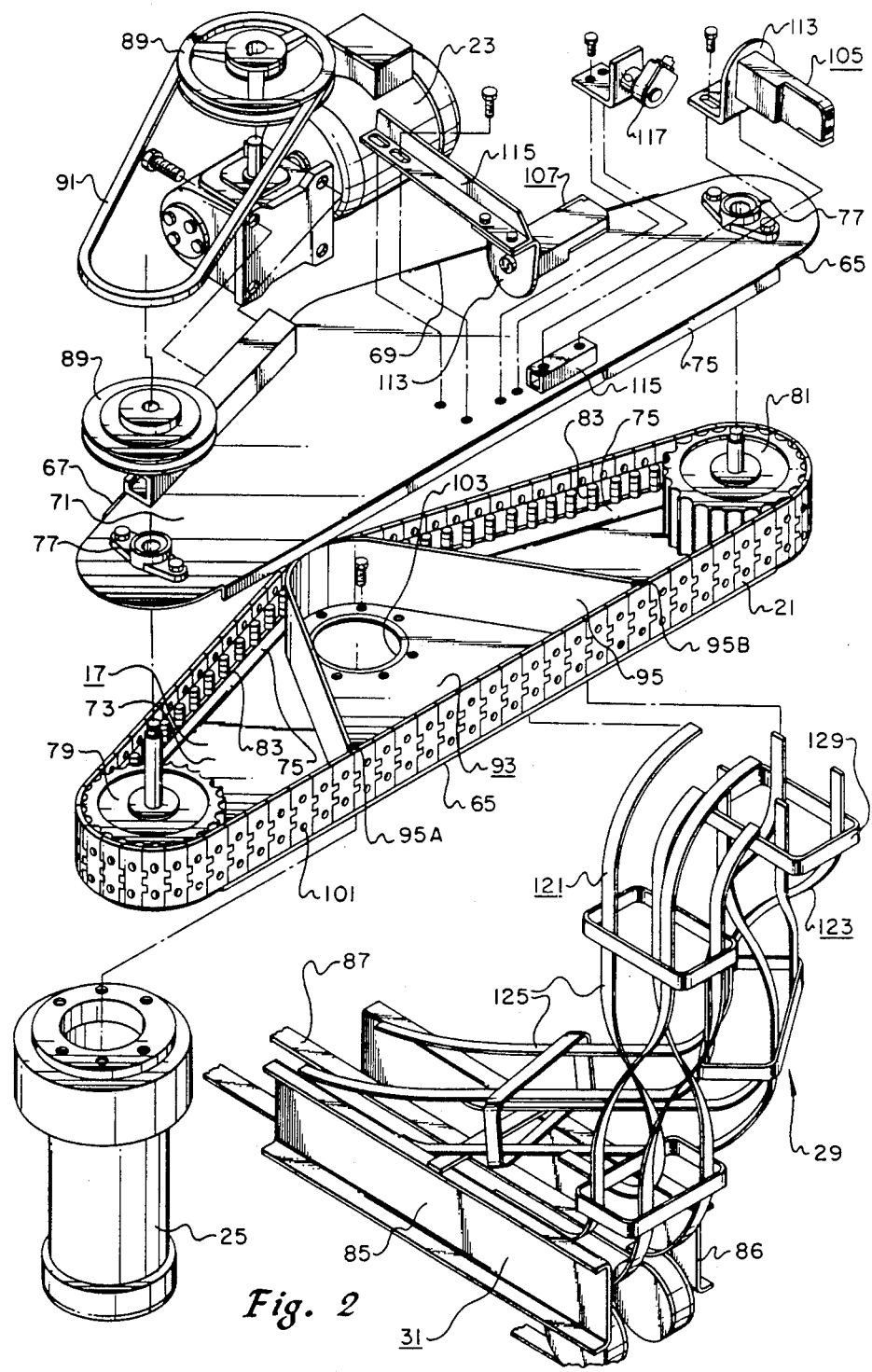
FIG. 2 is an exploded schematic isometric view of the apparatus of FIG. 1.

The can unscrambler apparatus 11 as shown in FIGS. 1 and 2 in accordance with the preferred embodiment of the invention includes as major components a table 17, a table stand 19, a table edge vacuum conveyer belt 21, a table edge vacuum conveyer belt motor 23, a blower motor 25, a sorting mechanism 27, an arranging mechanism 29, and a blender box 31. In addition, the apparatus receives and dispatches cans via an infeed conveyer 13, an infeed conveyer motor 15, and an outfeed conveyer 33.

Figure 5:
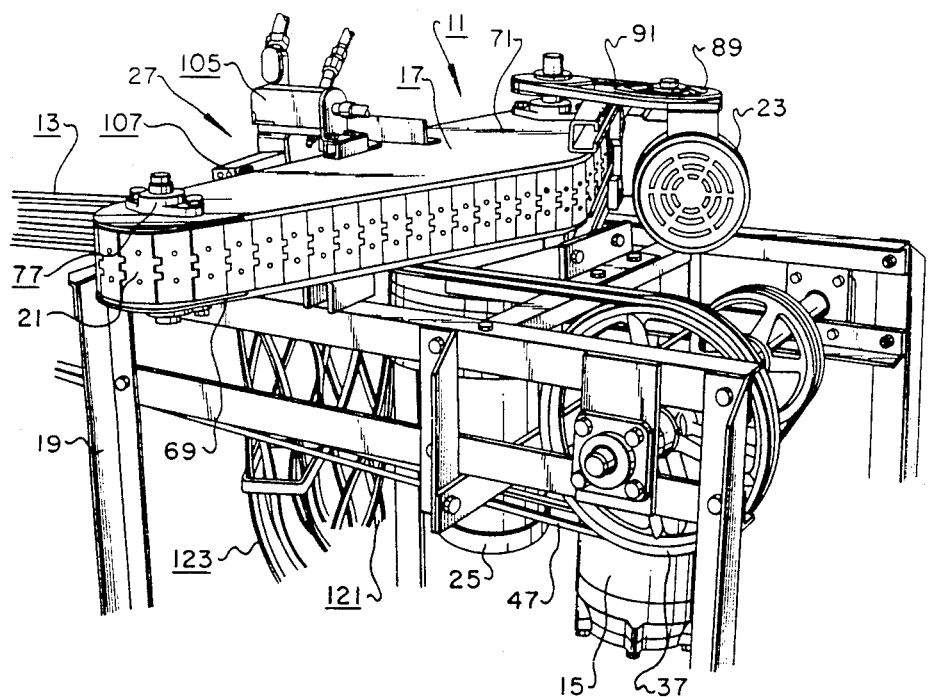
FIG. 5 is a view of the apparatus showing the rear right-hand side.

The infeed conveyer 13 is of the usual type for conveying cans 100 end-to-end and has left and right side rails 34 and 35 and moving cables 47 upon which the cans rest. The moving cables 47 are supported by support rails 36. An infeed motor 15 along with a large diameter pulley 37, located at the rear of the table 17, provide the mechanical power necessary to move the cables 47 and hence the cans. Where the infeed conveyer 13 meets the table 17, the cables traverse the distance between the end of the infeed conveyer and the infeed conveyer motor 15 and pulley 37 beneath the table (see FIG. 5). The right side rail 35 terminates very close to the table edge 65 while the left side rail 34 terminates several inches away from the table edge in order to allow cans to be unloaded from the infeed conveyer 13 onto the table edge conveyer belt 21. Appropriately placed stands 39 support the infeed conveyer 13 off of the floor 41. Incoming cans 100 are loaded in end-to-end fashion onto the infeed conveyer by a longitudinal can arranger 131 which will be described in more detail hereinafter.

Acceleration ramps 43 increase the distance between the incoming cans 100 in order to prevent jamming the apparatus with too many cans at one time. FIG. 6 illustrates such a ramp where the direction of travel is from right to left. Each acceleration ramp 43 has two sets of pulleys configured to transmit mechanical power from one set of moving cables to another, slower moving set of cables. Two drive pulleys 45 hold the drive cables 47 which are driven by the infeed motor 15 or by another acceleration ramp located closer to the table 17. Likewise two driven pulleys 49 hold the driven cables 51. The mechanical power necessary to drive the driven cables 51 is provided through the acceleration cable 53 which is wrapped around a first acceleration pulley 55 and a second acceleration pulley 57. The first acceleration pulley 55 turns in unison with the two drive pulleys 45 and the second acceleration pulley 57 turns in unison with the two driven pulleys 49. The first acceleration pulley 55 is of smaller diameter than the second acceleration pulley 57. Consequently, for every full revolution of the first acceleration pulley 55, the second acceleration pulley 57 rotates only a fraction of a full revolution, causing the driven cables 51 to move at a slower speed than the drive cables 47. Since there is no direct coupling between the drive cables 47 and the driven cables 51, cans are transferred over the gap via the transition cable 59. The transition cable 59 is driven by the first transition pulley 61 which is of the same diameter and rotates in unison with the drive pulleys 45. The second transition pulley 63, around which the transition cable 59 is wrapped, rotates free of the driven pulleys 49. Thus the transition cable 59 moves at the same speed as the drive cables 47. As each can 100 reaches an acceleration ramp 43, its speed increases to match the speed of the drive cables 47. Since the first can is moving faster than any cans behind it, the first can covers more distance and thus increases the distance between itself and the cans behind it.

The table 17, supported on the floor 41 by the table stand 19, is shaped like an isosceles triangle and has a front edge 65 and two back edges; a back left edge 67 and a back right edge 69. The table 17 also has a top portion 71 and a bottom portion 73. The edges of each portion have inwardly extending vertical flanges 75 used to support the table edge vacuum conveyer belt 21. The table edge vacuum conveyer belt 21 is a standard commercially available plastic segmented belt. The segments are joined together by hinges 83 located on the inner side of the vacuum belt 21. These hinges 83 serve several functions in addition to the obvious function of allowing greater bendability of the vacuum belt 21. The vacuum belt 21 is guided and supported along the table edge by a track formed by the vertical flanges 75 of the top and bottom portions 71, 73. At the two outer corners of the table 17, holes drilled through each portion allow bearings 77 to be attached to the table for the support of a drive sprocket 79 and a guide sprocket 81. The sprockets 79, 81 engage the hinges 83 to guide and impart motion to the vacuum belt 21. As long as the vacuum belt 21 is wrapped tightly around the table 17, the hinges 83 will stay in the track. One way to ensure the vacuum belt 21 is wrapped tightly around the table, is to size the outer circumference of the table 17 according to the inner circumference of the vacuum belt. A method allowing some adjustment utilizes an adjustable guide sprocket to achieve the desired belt tension. The vacuum belt 21 travels around the table 17 in clockwise manner as viewed from overhead. Thus the vacuum belt 21 travels from right to left along the front edge 65 of the table 17. The table edge vacuum conveyer belt motor 23 which is mounted onto the top portion of table 17 along one of the back edges 67 supplies the mechanical power necessary to move the vacuum belt 21. The motor 23 is coupled to the drive sprocket 79 by pulleys 89 and a belt 91.

A chamber 93 within the table 17 is created by the inside surfaces of the top and bottom portions 71, 73 and by a vertical wall 95 that extends from the bottom portion in an upward manner. The wall 95, fashioned in an accurate manner, extends from its left edge 95A to the back corner and then to its right edge 95B. The left edge 95A abuts the left side of the front edge 65 of the table 17, and the right edge 95B abuts the right side of the front edge of the table. The wall 95 is of sufficient height to abut the inside surface of the top portion. A rectangular open portion 99 is created in the chamber 93 along the front edge 65 of the table 17. The open portion 99 is defined by the free edges of the vertical flanges 75 along the front edges of the top and bottom portions 71, 73 of the table 17 and the left and right edges 95A, 95B of the vertical wall 95. The vacuum belt 21 traverses across this open portion 99. Apertures 101, extending through the vacuum belt 21, allow communication between the chamber 93 and the outside air. A circular hole 103 in the bottom portion 73 of the table is provided to complete an air circulation route inside of the chamber 93. The blower motor 25 is mounted to the underside of the table 17 such that it completely encompasses the circular hole 103. Except for the open portion 99 and the circular hole 103, once the top portion 71 of the table 17 is installed onto the bottom portion 73, the chamber 93 is air tight. When the blower 25 is turned on, it suctions air from the chamber creating a partial vacuum therein. Air from the outside enters the chamber 93 through whatever apertures 101 are in front of the open portion 99 in an effort to equalize pressure. An air flow is established at the apertures 101 in an inward direction, thus lowering the pressure and creating a partial vacuum at the apertures. An object abutting the vacuum belt 21 in such a way that a space is created between the belt and the object, and that space overlays at least one aperture, can be held on the vacuum belt and possibly even supported by the suction created. Unfilled aluminum cans of the type used for beverages are ideally suited for conveyance along flat vacuum belts since both ends of a can are flat and have an air space. The bottom end of a can, even though it is closed, has a small cavity and the open top end of the can has, of course, a very large cavity consisting of the interior of the can. Thus either end of the can presents an appropriate air space upon which a suction can be maintained. In addition, the weight of an unfilled can is very slight, enabling the can to be conveyed in any position, including horizontally. In the preferred embodiment, the apertures 101 are distributed along the vacuum belt 21 such that any can placed on the vacuum belt in a random manner will overlay at least one aperture. An alternative arrangement of conveying cans along the belt by suction means or partial vacuum means is to create an air pocket between the belt and the can by reconfiguring the belt. Instead of a flat belt, the outer surface of the belt could have small pockets that are sealed by the sides of the can. In this manner, cans having inadequate air pockets at the ends could be conveyed along the table edge.

The sorting mechanism 27 includes a first infrared proximity switch 105, a second infrared proximity switch 107, an air solenoid 117, the vacuum belt 21, the upper portion of the left-hand gravity track 121, and the upper portion of the right-hand gravity track 123. The two infrared proximity switches 105, 107 are standard commercially available proximity detectors. The preferred embodiment utilizes Type 42 MRA photoelectric controls, manufactured by Electronics Corporation of America, Photoswitch Division. Employing a converging infrared beam, the proximity switches can detect surfaces that are within its field of view, which is about two inches away from the sensory elements. As long as the closed end is within two inches of the sensory elements, the closed end will be detected. A can oriented with its open end towards the sensory elements has its closed end beyond the field of view since the can is typically 4 ½ to 5 inches in length. Each proximity switch has as part of its sensory elements two small lenses; one 109 of which directs an infrared beam, the other 111 receives the reflection off of a nearby surface. The sensory elements, are connected to a sensor and switch activator portion 112 of the proximity switch (see FIG. 7). Two different outputs are available from the Type 42 MRA proximity switches 105, 107; a normally closed switch and a normally open switch. The normally closed switch opens and the normally open switch closes whenever activated by the sensor and switch activator portion 112. Only the normally open switches 114A, 114B are utilized in the preferred embodiment. The proximity switches can operate in one of two modes; light energized and dark energized. In the light energized mode, the sensor and switch activator portion 112 activates the switches upon detection of a nearby surface. In the dark energized mode, the sensor and switch activator portion 112 activates the switches upon the failure to detect a nearby surface.

Figure 3:
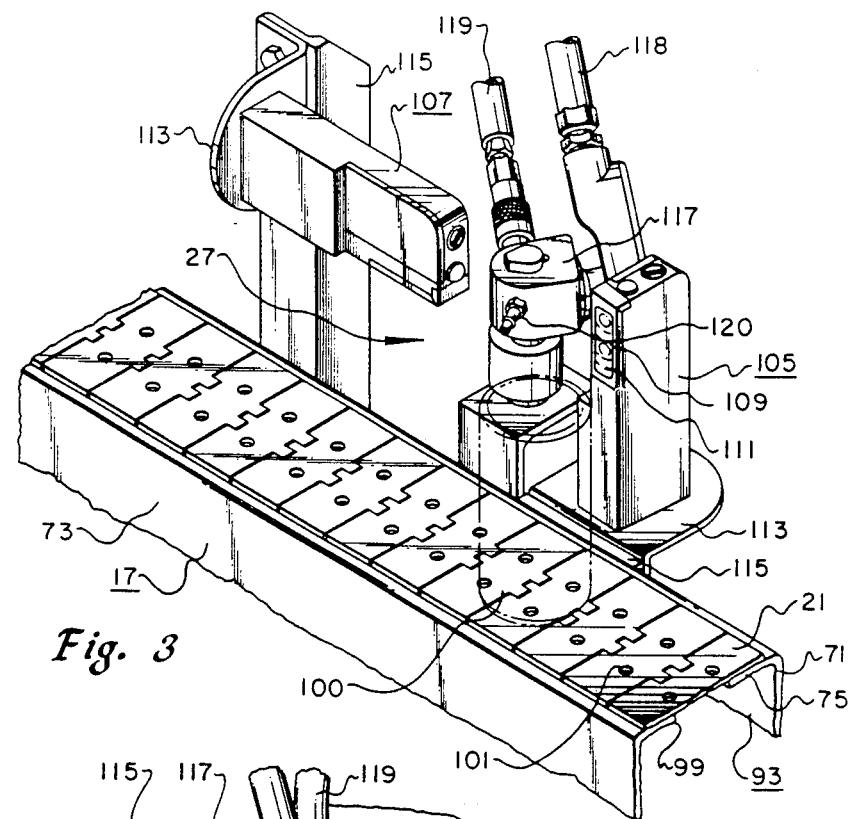
FIG. 3 is a view of a portion of the sorting mechanism of FIG. 2 as seen from the lower right-hand side and rotated 90° rearward.
Figure 4:
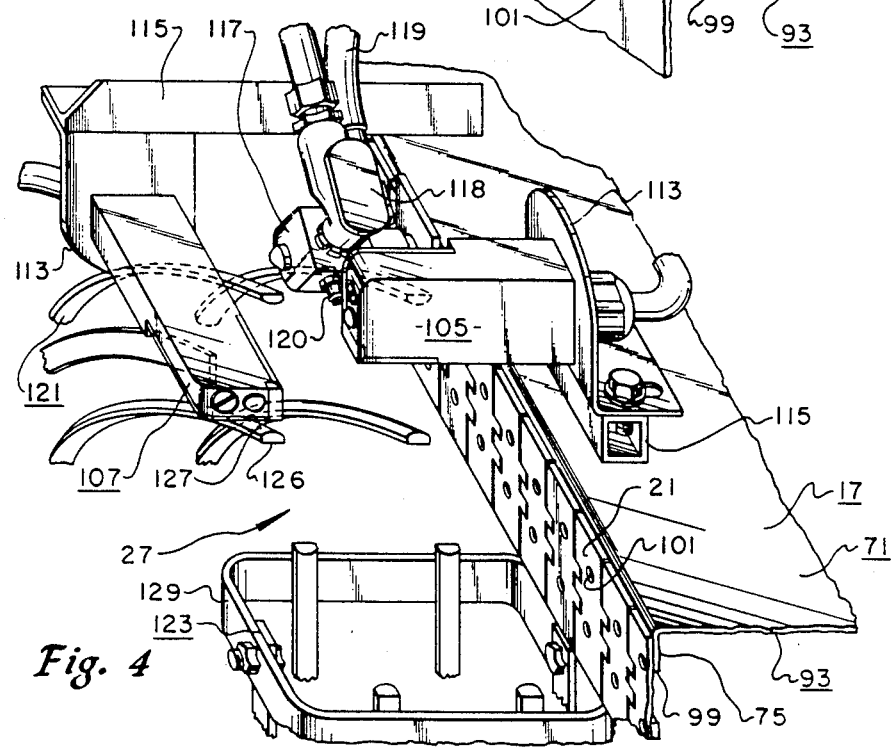
FIG. 4 is a view of the sorting mechanism, showing the upper portions of the arranger mechanism, as seen from the upper right-hand side.

Referring to FIGS. 3 and 4 the proximity switches 105, 107 are mounted on universal mounts 113 which in turn are mounted onto mounting brackets 115 that are bolted onto the top portion 71 of the table 17. The universal mounts 113 allow rotation of the proximity switches 105, 107 for alignment purposes. The first proximity switch 105 senses the side of a can and determines when the end of a can is present in the field of view of the second proximity switch 107. In order to do this, the first proximity switch 105 juts out in a perpendicular manner from the top of the table 17 past the vacuum belt. The second proximity switch 107 faces the vacuum belt with its sensory elements. Sufficient distance is allowed between the second proximity switch 107 and the vacuum belt 21 to enable a can to pass through. This proximity switch 107 senses the outermost end of the can and determines if the end is open or closed. The air solenoid 117 is also a standard commercially available item and comprises a solenoid controlled valve for releasing pressurized air when activated. The solenoid 117 has an electrical input 118, a pressurized air input 119, and a pressurized air output nozzle 120. Pressurized air is input into the solenoid 117 from an external supply. Such pressurized air supplies are common to beverage plants; typically the air is pressurized to around 100 psi. The solenoid 117 is mounted to the top portion 71 of the table 17 with the nozzle 120 pointed to the side of a can within the field of view. Immediately below the field of view is the upper portion of the right-hand gravity track 123. To the left of the field of view is the curved upper portion of the left-hand gravity track 121 positioned to remove any can that passes the proximity switches 105, 107 from the belt. Once a can passes the proximity switches it always goes into the left-hand gravity track 121.

FIG. 7 illustrates the wiring connection between the two infrared proximity switches 105, 107 and the coil 117A of the air solenoid 117. Power is continuously applied to the sensor and switch activator portion 112 of the first infrared proximity switch 105 which is in the light energized mode. Power to the sensor and switch activator portion. 112 of the second infrared proximity switch 107 is controlled through the normally open switch 114A of the first proximity switch. The coil 117A of the solenoid 117 is controlled via the normally open switch 114B of the second infrared proximity switch 107 which is set to the dark energized mode.

The cans are arranged into the proper orientation by the arranging mechanism 29 which includes the left-hand gravity track 121 and the right-hand gravity track 123. Each gravity track is composed of body rods 125 having a flat base portion 126 and a rounded top portion 127. The body rods are configured into a rectangular chute by braces 129 attached to the flat base portions 126. The inner dimensions of the chute are roughly equivalent to the outer dimensions of unfilled cans. The gravity tracks 121, 123 lead from the sorter mechanism 29 downward to the blender box 31. As a can decends towards the floor in the righthand gravity track 123 the can is rotated counterclockwise 90°. Cans decending in the left-hand gravity track 121 are rotated clockwise 90°. The cans are thus arranged into the same orientation.

Figure 8:
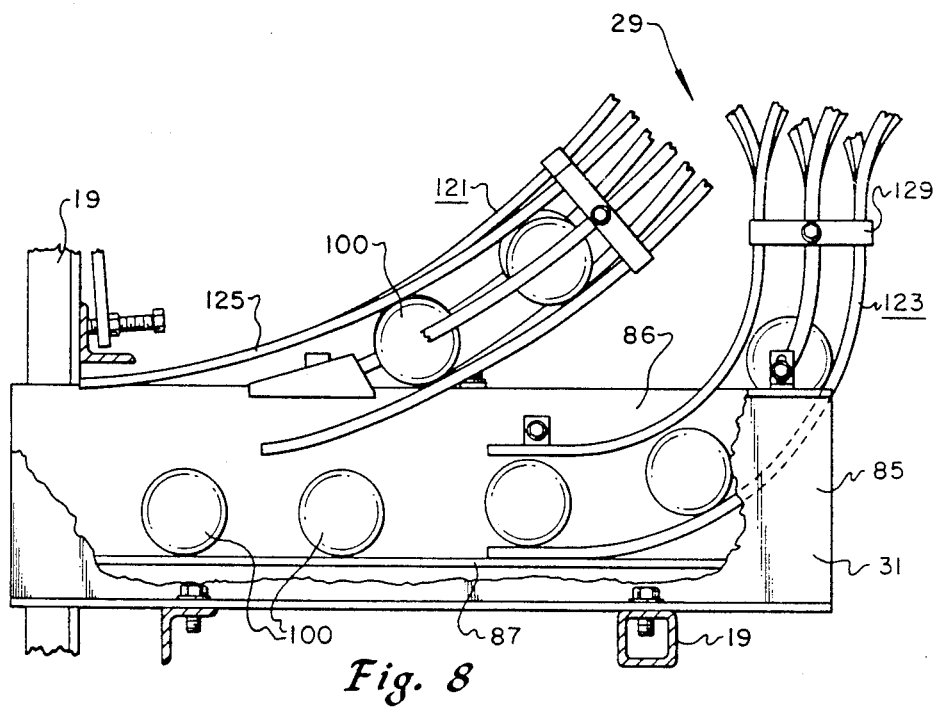
FIG. 8 is a partially cut away view of the blender box and arranging mechanism.

The blender box 31 has a left side wall 85, a right side wall 86 and a bottom conveyer belt 87. The cans, conveyed sideways, are kept in alignment by the side walls 86 which prohibit rotation of the cans 31. The gravity tracks 121, 123, after having arranged the cans into their proper orientation, dump the cans into the blender box 31 which conveys them via the bottom conveyer belt 87 to an outfeed conveyer 33 and on into the manufacturing process (see FIG. 8). As the cans from one gravity track fall into the blender box 31, they mingle or blend with the cans that have fallen from the other gravity track. The bottom conveyer belt 87 may be powered by the infeed conveyer motor 15 or by some other motor.

Operation of the apparatus is as follows: randomly oriented cans 100 are loaded onto the infeed conveyer 13 in end-to-end fashion and proceed downstream to the table 17. Upon arriving at the vacuum belt 21 at a point to the left of the right edge 95B of the wall 95, the downstream end of each can becomes coupled to the vacuum belt by the partial vacuum created inside the end air pocket and the can is discharged from the infeed conveyer 13. The vacuum belt 21 moves the can into the sorter mechanism 27 which sorts or separates the cans into two categories. The first category consists of those cans that have their open ends facing away from the table 17. The second category consists of those cans that have their open ends facing towards the table 17. In order to effectively sort the cans into their appropriate categories, the open ends must be distinguished from the closed ends. This is done in the preferred embodiment by infrared proximity switches 105, 107, although other types of proximity switches may be used. Once the ends have been distinguished, the cans must be guided into one of two preselected positions. For example, in the preferred embodiment, when a can is not in front of the sensory element of the first proximity switch 105, the second proximity switch 107 is off and the normally open switch 114B stays open. However when a can 100 is in front of the sensory elements of the first proximity switch 105, the normally open switch 114A closes, turning on the second proximity switch 107 and thereby indicates a can is within the field of view. If the open end faces the second proximity switch 107 (since the second proximity switch is in the dark energized mode and therefore it does not detect the open end of the can) the sensor and switch activator portion 112 activates the switches and closes the normally open switch 114B. This in turn activates the solenoid 117 and releases a stream of pressurized air toward the side of the can. The can 100, knocked off the vacuum belt 21 by the pressurized air, enters the upper portion of the right-hand gravity track 123 located below the first proximity switch 105. Once the can has left the field of view, the first proximity switch 105 turns off the second proximity switch 107 which then shuts off the air solenoid 117. As the can descends inside of the right-hand gravity track 123, it is turned counterclockwise. By the time the can enters the blender box 31, its open end faces the right side wall 86 at the blender box 31. If however, the closed end of the can faces the second proximity switch, the solenoid is not activated and the can enters the upper portion of the left-hand gravity track 121. The can is removed from the vacuum belt 21 by the track 121 before it reaches the left edge 95A of the wall 95. Each can is loaded onto and removed from the vacuum belt at some point within the limits defined by the open portion 99 and between the edges 95B and 95A. This enables the can to be firmly held onto the vacuum belt by a partial vacuum during the time the can is on the vacuum belt. As the can descends inside of the left-hand gravity track, it is turned clockwise such that by the time the can enters the blender box 31, its open end also faces the right side wall 86 of the blender box 81. Thus the cans, no matter what their previous orientation, are arranged into the same orientation.

The sorting mechanism allows flexibility in arranging the cans. In the preceding paragraph the open ends were arranged to face towards the right side wall 86. By simply changing the second proximity switch from the dark energized mode to the light energized mode, the open ends would be arranged to face towards the left side wall 85.

An alternative embodiment would utilize only one proximity switch positioned to sense the outer ends of cans.

Throughout the entire unscrambling process, control is maintained over the cans. As the cans are conveyed on the vacuum belt, they are held tightly in place by a partial vacuum. Secured in this way, the cans are conveyed into the sorter mechanism where they are removed from the vacuum belt and guided elsewhere; either the cans are air blasted off into a gravity track, or removed by another gravity track. At no time is a can left uncontrolled. This insures a high degree of reliability in unscrambling the cans.

DESCRIPTION OF THE EMBODIMENT OF FIGS. 9–14

Figure 9:
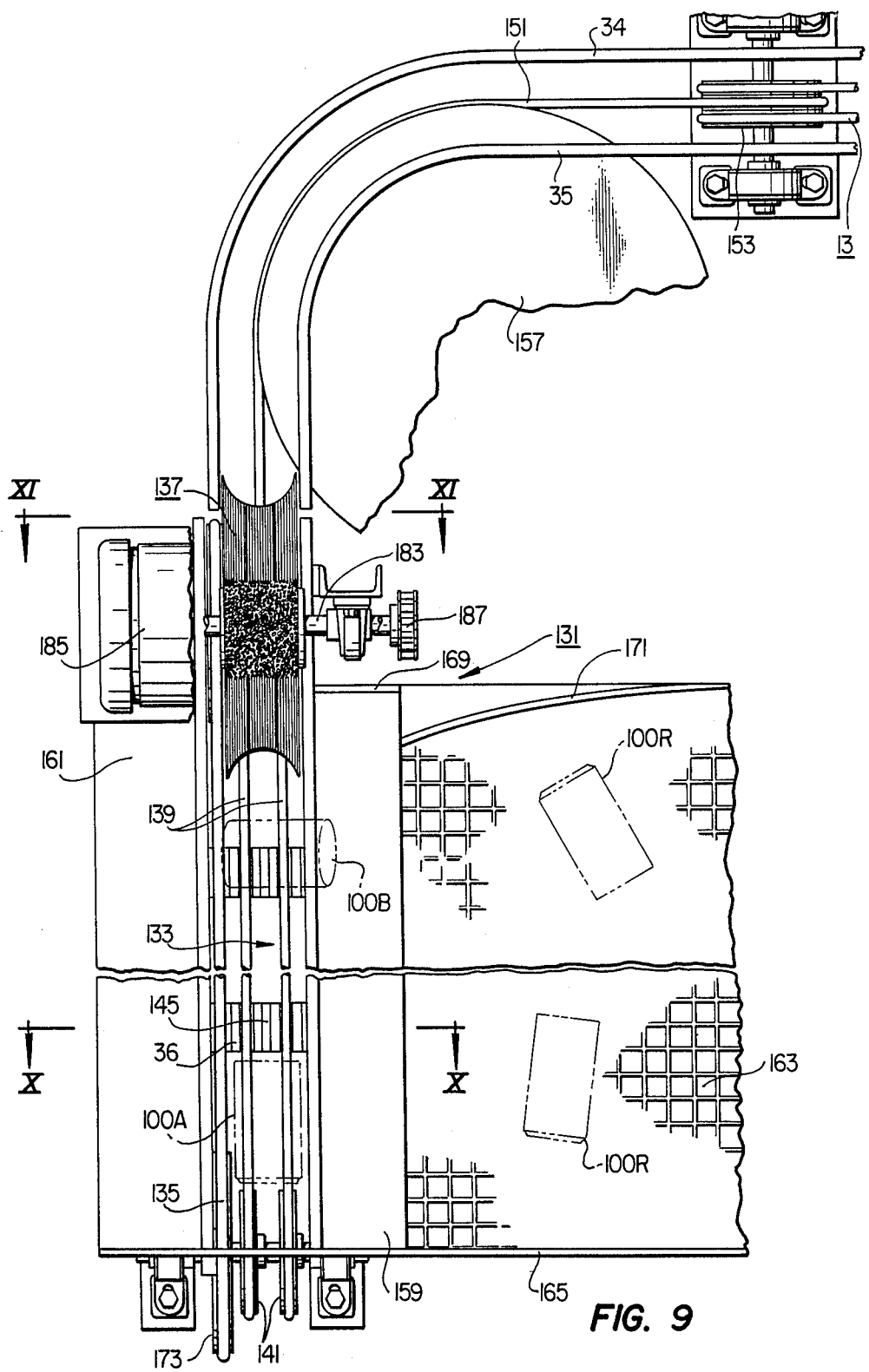
FIG. 9 is a schematic plan view of the longitudinal can arranger apparatus in accordance with a preferred embodiment.

In FIG. 9, there is shown the longitudinal can arranger apparatus 131, in accordance with a preferred embodiment. The longitudinal can arranger apparatus 131 arranges randomly oriented cans into a longitudinal mode and loads the cans onto the infeed conveyer 13 for transport to the can unscrambler 11. The longitudinal can arranger apparatus 131 includes a collection conveyer 133, a turning belt 135 and a brush assembly 137.

Figure 10:
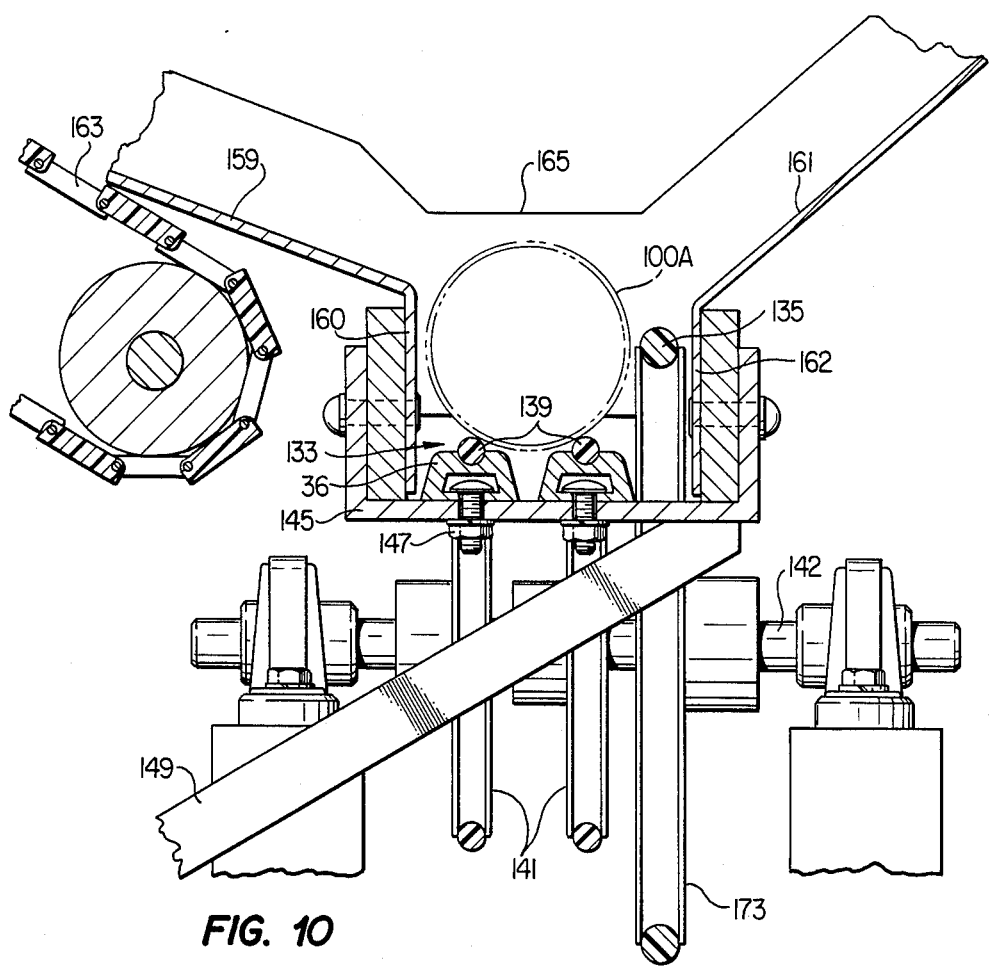
FIG. 10 is a schematic cross-sectional view of the longitudinal can arranger apparatus of FIG. 9, looking upstream and taken at lines X—X.
Figure 11:
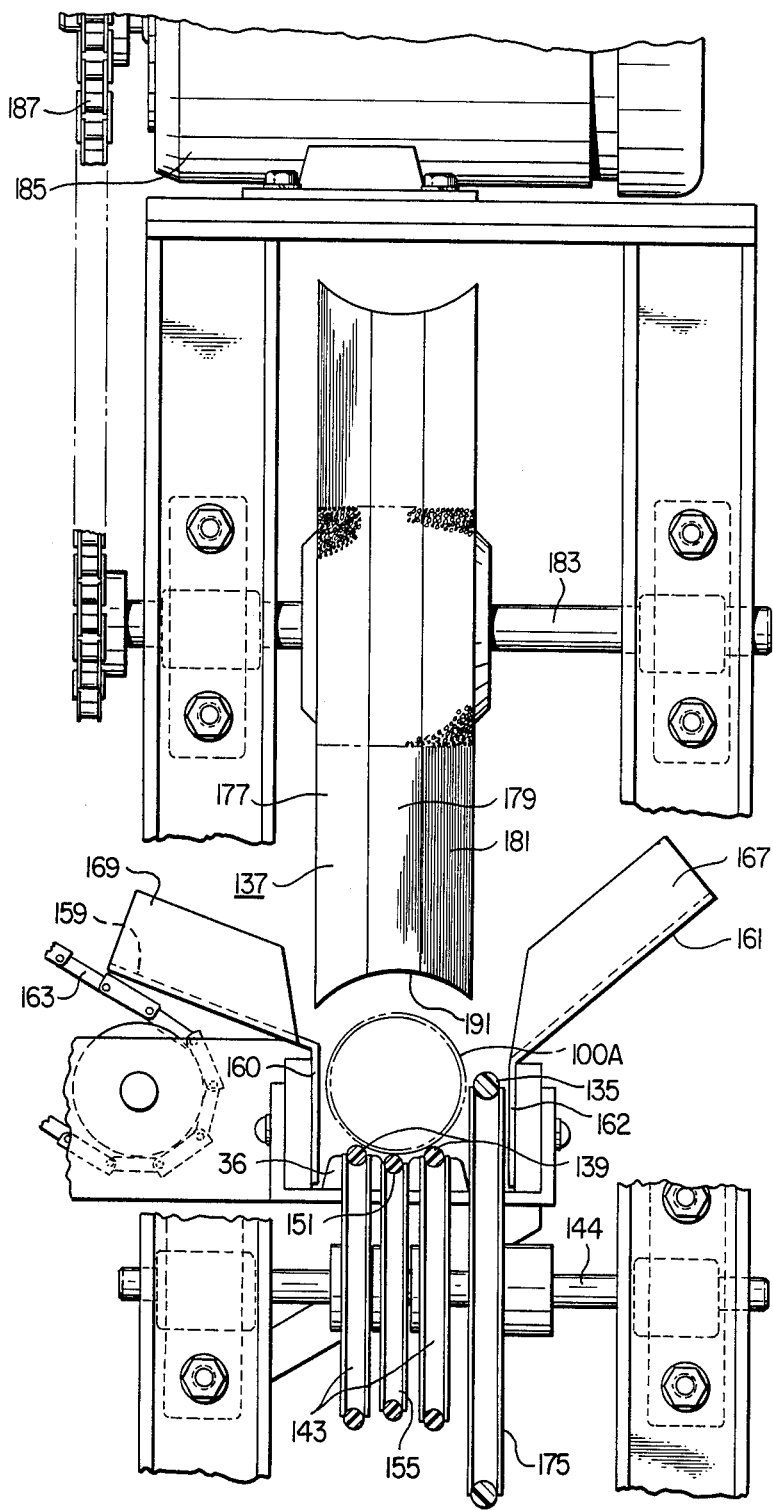
FIG. 11 is a schematic cross-sectional view of the longitudinal can arranger apparatus of FIG. 9, looking upstream and taken at lines XI—XI.

Referring to FIGS. 9–11, the collection conveyer 133 has two endless cables 139 or belts that are parallel to one another. The cables 139 are spaced apart from each other so as to form a short gap between the two. This cable arrangement is favorable for conveying cans 100A which are in a longitudinal mode (with one end facing downstream and the other end facing upstream) since longitudinal mode cans have their centers of gravity located between the two cables 139. The two cables extend between two sets of pulleys, an upstream set 141 and a downstream set 143 (in FIG. 9, the cans travel from the bottom of the figure to the top). The upstream and downstream sets each have two pulleys 141, 143 that are mounted on respective shafts 142, 144 so as to rotate in unison. The upper portions of the cables are supported by support rails 36, which in turn are supported by U-shaped brackets 145 (see FIG. 10). The support rails 36 are secured to the bottom portions of the U-shaped brackets by bolt and nut assemblies 147. Conventional support members 149 support the collection conveyer 133 above the ground.

The collection conveyer cables 139 are indirectly driven by the infeed motor 15 (see FIG. 1) through the acceleration ramps 43 and other pulley arrangements. The cables of the infeed conveyer 13 drive a connecting conveyer cable 151, through a pulley arrangement 153 which is configured such that the pulleys all rotate in unison (see FIG. 9). The connecting conveyer cable 151 connects the collection conveyer 133 to the infeed conveyer 13 after negotiating a 90° horizontal turn. The connecting conveyer cable 151 drives the collection conveyer cables 139 through a central pulley 155 located on the same shaft 144 and between the collection conveyer downstream set of pulleys 143, where all three pulleys rotate in unison. The connecting conveyer cable 151 extends from the collection conveyer 133 around a horizontally oriented pulley 157 to the infeed conveyer 13. The left and right side rails 34, 35 of the infeed conveyer extend upstream to a point just downstream of the brush assembly 137. The upstream, downstream and infeed conveyer pulley arrangements 141, 143, 153 are all conventionally mounted.

The collection conveyer 133 extends through a collection zone where randomly oriented cans 100R are loaded onto the conveyer. The collection zone includes a loading ramp 159 and a deflector plate 161. The loading ramp 159 inclines upwardly and outwardly away from the collection conveyer 133. The loading ramp 159 has a mounting portion 160 which is a vertical plate. The loading ramp mounting portion 160 is attached in a conventional manner to one of the sides of the U-shaped brackets 145. The upper end portion of the loading ramp lies just above the upper surface of an inclined mat 163. The upper surface of the inclined mat 163 moves downwardly toward the loading ramp to deliver tipped cans 100 from a conventional can washer apparatus (not shown). The tipped cans, which are randomly oriented, are frequently wet from the washing process. In order to minimize any adherence by wet cans to the loading ramp, the top surface of the loading ramp 159 is a mat (not shown). The loading ramp mat is reinforced underneath by a metal plate to provide rigidity. The deflector plate 161, which is located across the collection conveyer 133 from the loading ramp 159, inclines upwardly and outwardly away from the collection conveyer. Like the loading ramp 159, the deflector plate 161 has a vertical mounting portion 162. The deflector plate mounting portion 162 is attached in a conventional manner to the other side of the U-shaped brackets 145 (the side of the U-shaped brackets that is not attached to the loading ramp).

The collection conveyer 133 is located at the bottom of a channel formed by the U-shaped brackets 145 and the mounting portions 160, 162 of the loading ramp and the deflector plate. Because of the upward inclinations of the loading ramp 159 and the deflector plate 161, the collection conveyer 133 and its channel are located in the lowest area of the collection zone. Thus, any cans in the collection zone will move down towards the collection conveyer 133 and its channel.

A vertical end wall 165 is provided at the upstream end of the collection conveyer 133 to prevent cans from falling off onto the floor. The upstream wall 165 extends from the collection conveyer 133 along the end of the deflector plate 161 in one direction, and along the end of the loading ramp 159 and the edge of the inclined mat 163 in the other direction. Vertical end walls 167, 169, 171 are also provided at the downstream end of the collection zone, specifically along the downstream ends of the deflector plate 161 and of the loading ramp 159, and along the downstream edge of the inclined mat 163. The end wall 171 which is provided along the downstream edge of the inclined mat 163 is bent towards the upstream end wall 165 as the end wall 171 approaches the collection conveyer 133, so as to deflect cans on the inclined mat 163 away from the brush assembly 137.

The turning belt 135 or cable, which is adjacent to the collection conveyer 133, also extends through the collection zone. Referring to FIG. 10, the turning belt 135 is lateral to the collection conveyer inside of the collection conveyer channel and is located between the deflection plate mounting portion 162 and the collection conveyer cables 139. The turning belt 135 is located above the collection conveyer cables 139. The turning belt 135 is placed around upstream and downstream pulleys 173, 175 that are on the same shafts 142, 144, and turn in unison with, the respective upstream and downstream sets of pulleys 141, 143 for the collection conveyer cables 139. Like the collection conveyer cables 139, the turning belt 135 is driven by the connection conveyer cables 151 and its central pulley 155. The upstream and downstream turning belt pulleys 173, 175 are of a larger diameter than the collection conveyer pulleys 141, 143 in order to provide a faster traveling speed for the turning belt 135 relative to the collection conveyer cables 139.

Figure 12:
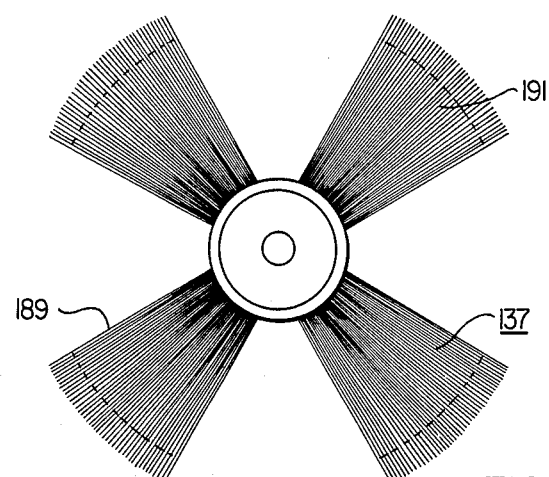
FIG. 12 is a schematic side view of the brushes.

The brush assembly 137 is located downstream from the collection zone and is positioned directly over the collection conveyer cables 139. The brush assembly 137 is made up of three conventional soft bristle brushes 177, 179, 181 (see FIG. 11) that are mounted on the same shaft 183 and rotate in unison. The shaft 183 is mounted in a conventional manner and is parallel to the shaft 144 supporting the collection conveyer downstream set of pulleys 143. A drive motor 185 mounted atop the brush assembly 137 rotates the brush assembly 137 via a conventional drive chain arrangement 187. The drive motor 185 rotates the brush assembly 137 in the direction that causes the bristles nearest the collection conveyer cables 139 to move upstream relative to the collection conveyer cables so that the brush assembly rotates against the flow of cans traveling on the collection conveyer 133. The bristles of the brush assembly project radially outward from the shaft 183. The outer ends of the bristles are contoured to form a concave transverse crosssectional shape, wherein the bristles of the center brush 179 are shorter than the bristles of the outer brushes 177, 181. Sections of bristles have been removed from the brush assembly 137 as shown in FIG. 12, so as to form gaps 189 of empty space between the remaining bristle sections 191.

With the brush assembly positioned close enough to the top of the collection conveyer channel, cans that are not in the longitudinal mode are prevented from leaving the collection zone and proceeding downstream. The brush assembly 137 delineates the top of an opening which is formed between the brush assembly and the channel. The width of the opening is determined by the width of the channel, which is the distance between the loading ramp mounting portion 160 and the turning belt 135, while the height of the opening is determined by the distance between the collection conveyer cables and the ends of the brush assembly bristles.

The operation of the longitudinal can arranger apparatus will now be described. Randomly oriented cans 100R are conveyed down the inclined mat 163 towards the collection conveyer 133. The cans traverse the loading ramp 159 and arrive at the collection conveyer in various orientations or modes. Referring to FIG. 11, cans 100A that are in a longitudinal mode upon the collection conveyer 133 pass beneath the brush assembly 137 untouched by any bristles 191. The longitudinal mode cans 100A then proceed onto the connection conveyer cable 151 and the infeed conveyer 113, all the while being conveyed in a longitudinal mode.

Figure 13:
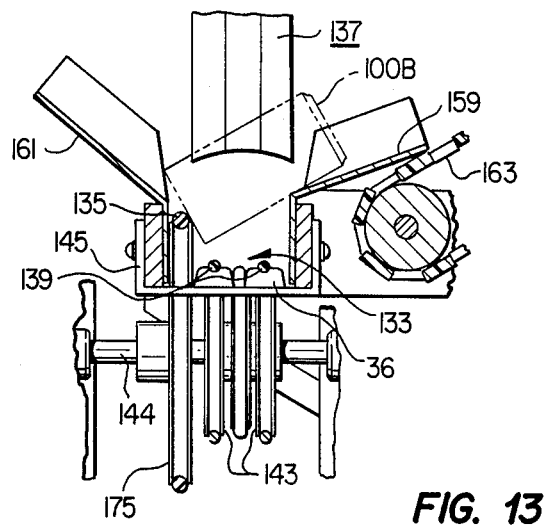
FIGS. 13 and 14 are schematic cross-sectional views of the longitudinal can arranger apparatus looking downstream and illustrating the operation of the apparatus.

Some cans 100B arrive at the collection conveyer 133 in a crosswise mode wherein one end contacts the turning belt 135 and the other end is still on the loading ramp 159 (see FIG. 13). The end of the can 100B contacting the turning belt 135 is moved downstream, turning the can so that it falls onto the collection conveyer 133 in a longitudinal mode. If the crosswise mode cans 100B do not get turned around by the time the cans reach the brush assembly 137, which is rotating against oncoming can traffic, the cans will contact the bristles of the brush assembly and be tossed back upstream into the collection zone. Once back in the collection zone, the tossed cans have a chance to become aligned into the longitudinal mode. The gaps 189 in the brush assembly allow the brushes to toss the cans upstream. Since the bristles in the brush assembly are soft, and since the cans are not tossed over great distances, the cans are not damaged, even if they are made of aluminum.

Figure 14:
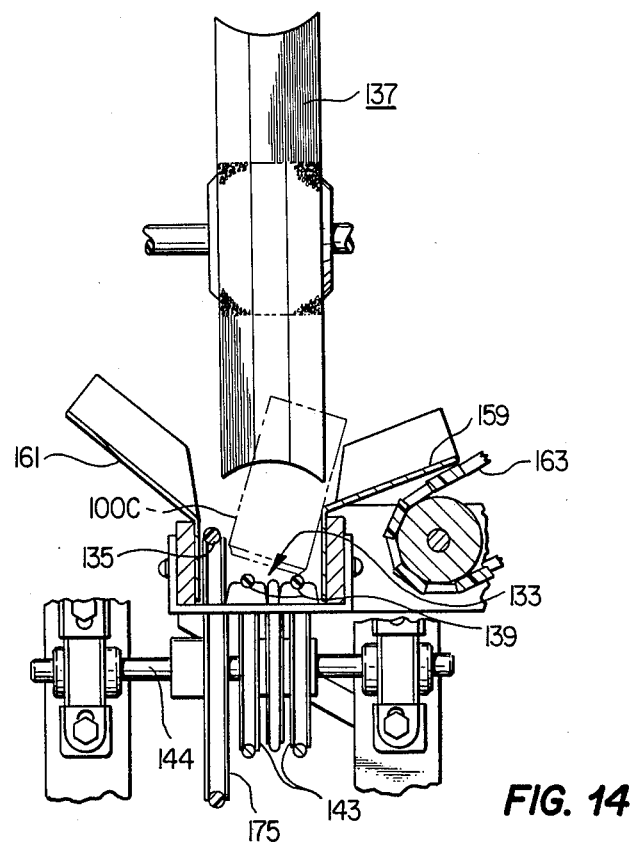

Some cans 100C arrive at the collection conveyer 133 in an upended mode (see FIG. 14). Cans 100C in the upended mode are unable to pass through the opening at the brush assembly and they are tossed back into the collection zone by the brush assembly 137, where they have another chance to become aligned into the longitudinal mode.

The loading ramp and the deflector plate catch the cans that are tossed back by the brush assembly. The cans then move down to the collection conveyer. The deflector plate additionally deflects cans that have overshot the collection conveyer, when moving down from the inclined mat, back into the collection conveyer.

Thus it can be seen that the longitudinal can arranger apparatus takes cans of random orientation and arranges them longitudinally so that they may be reinserted into the can manufacturing process, and does so in a fully automatic manner. Cans that are not in a longitudinal mode on the collection conveyer are either aligned into the longitudinal mode by the turning belt or are prevented from exiting the collection zone by the brush assembly. The combination of the brush assembly and the collection conveyer channel act as a gateway, with the gateway forming an opening that lets only longitudinal cans pass through. The desired shape of the opening can be maintained while varying the depth of the collection conveyer channel and the concavity of the brush assembly bristle contours. Thus, for example, the depth of the collection conveyer channel could be lessened with a corresponding increase in the concavity of the brush assembly contours.

Jamming is a major concern in can handling equipment, particularly in equipment that handles aluminum cans. Aluminum cans are especially difficult to handle when wet since they exhibit a tendency to stick to surfaces. However, the longitudinal can arranger apparatus is fully automatic since cans are unlikely to jam anywhere in the apparatus. This is true even with the brush assembly. If, for example, a crosswise mode can comes up against the brush assembly and is not tossed back, other cans behind the crosswise mode can will push the crosswise mode can further into the brush assembly until it is tossed back upstream. The more cans that stack up behind such a crosswise mode can, the greater the force pushing the can into the brushes and the better the grip the brushes can get on the can to toss it back.

Although the longitudinal can arranger apparatus has been described with reference to arranging cans coming out of a washer apparatus, the longitudinal can arranger apparatus can be utilized at other stages of the manufacturing process such as at the exit of ovens which are used to dry paint or coatings on the cans.

The foregoing disclosure and the showings made in the drawings are merely illustrative to the principles of this invention and are not to be interpreted in a limiting sense.

I claim:

1. An apparatus for conducting operations on unfilled cans of the type having an open end and a closed end and that have become disoriented such that the open ends of some cans face different directions from the open ends of other cans and the closed ends of some cans face the same direction as the open ends of other cans, said operations resulting in the orientation of said cans such that all of the open ends of said cans face the same direction and all of the closed ends of said cans face a direction opposite to the direction faced by the open ends, comprising:

means for sorting said cans into said first and second categories, said first category comprising those cans that have their open ends facing a first direction and said second category comprising those cans that have their open ends facing a second direction that is opposite to said first direction, conveying means for conveying said cans one at a time through said means for sorting said cans, said cans being conveyed until disengaged from said conveyance means by said means for sorting said cans, whereby the movement of said cans is continually controlled, said conveying means comprising, a chamber with an open portion, belt means supported to move past said open portion, means for moving said belt means past said open portion, apertures extending through said belt means, means for creating a partial vacuum in said chamber for producing a partial vacuum at the apertures for holding the cans onto said belt means, means for arranging said sorted cans into the same orientation so that all of the open ends of said cans face the same direction and all of the closed ends of said cans face in a direction which is opposite to the direction faced by the open ends, said means for sorting said cans further comprises means for distinguishing between said open ends and said closed ends of said cans and means for guiding said cans of said first category to an arranger means and said cans of said second category to another arranger means, said means for distinguishing between said open ends and said closed ends of said cans comprises proximity detecting means for sensing the outwardly facing ends of said cans on said belt means for determining whether said cans are in said first or second orientation on said belt means, said guide means comprises means responsive to said detecting means for producing an air blast against each of said cans on said belt means which is in a predetermined one of said orientations on said belt means to remove said cans from said belt means.

2. The apparatus of claim 1 further comprising infeed conveyer means for moving cans to said belt means for transfer to said belt means such that the ends of the cans are held on said belt means by the reduced air pressure at said apertures with the other ends of the cans facing outwardly of said belt means.

3. A system for conducting operations on unfilled cans of the type having an open end and a closed end and that have become disoriented such that the open ends of said cans face random orientations, said operations resulting in the orientation of said cans such that all of the open ends of said cans face the same direction, comprising:

a conveyer extending through a collection zone, wherein said cans of random orientation are loaded onto said conveyer in said collection zone and said conveyer conveys said cans downstream away from such collection zone, a turning belt positioned adjacent to said conveyer in said collection zone, said turning belt being located laterally to and above said conveyers such that cans that are in a crosswise mode over said conveyer contact the turning belt with one of said ends, means for moving said turning belt in a direction which is parallel to said conveyer, wherein said turning belt pulls said one end of the crosswise mode cans so as to turn the crosswise mode cans into a longitudinal mode upon said conveyer, gateway means located adjacent to said conveyer and at a position downstream from said collection zone, said conveyer being located to convey collected cans which have been loaded onto said conveyer in said collection zone into said gateway means, said gateway means forming an opening, said opening having a shape so as to allow cans arranged in a longitudinal mode upon said conveyer to pass through and proceed downstream and so as to prevent the passage of cans in other modes, said gateway means having means for removing said cans which have been prevented from passing through said opening from said opening, said conveyer being located so as to move said longitudinal mode cans onto a second conveyer, means for sorting said cans upon said second conveyer into first and second categories, said first category comprising those cans that have their open ends facing a first direction and said second category comprising those cans that have their open ends facing a second direction that is opposite to said first direction, said second conveyer conveying said cans one at a time through said means for sorting said cans, said cans being conveyed until disengaged from said second conveyer by said means for sorting said cans, whereby the movement of said cans is continually controlled, means for arranging sorted cans into the same orientation such that all of the open ends of said cans face the same direction and all of the closed ends of said cans face in a direction which is opposite to the direction faced by the open ends, said second conveyer comprising, a chamber with an open portion, belt means supported to move past said open portion, apertures extending through said belt means, means for creating a partial vacuum in said chamber for producing a partial vacuum at the apertures for holding the cans onto said belt means, said means for sorting said cans further comprising means for distinguishing between said open ends and said closed ends of said cans and means for guiding said cans of said first category to a first arranger means and said cans of said second category to a second arranger means, said means for distinguishing between said open ends and said closed ends of said cans comprising proximity detecting means for sensing the outwardly facing ends of said cans on said belt means for determining whether said cans are in said first or second orientation on said belt means, said guide means comprising means responsive to said detecting means for producing an air blast against each of said cans on said belt means which is in a predetermined one of said orientations on said belt means to remove said cans from said belt means.

* * * * *